US008355041B2

(12) United States Patent
Chen et al.

(10) Patent No.: US 8,355,041 B2
(45) Date of Patent: Jan. 15, 2013

(54) TELEPRESENCE SYSTEM FOR 360 DEGREE VIDEO CONFERENCING

(75) Inventors: Wen-Hsiung Chen, Sunnyvale, CA (US); Patrik Buckingham, Gilroy, CA (US); Chandrodaya Prasad, Sunnyvale, CA (US); Prasad Miriyala, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1244 days.

(21) Appl. No.: 12/031,209

(22) Filed: Feb. 14, 2008

(65) Prior Publication Data

US 2009/0207234 A1    Aug. 20, 2009

(51) Int. Cl.
*H04N 7/14*    (2006.01)
(52) U.S. Cl. ..................... 348/14.12; 348/14.13; 348/36
(58) Field of Classification Search .... 348/14.12–14.15, 348/36; 359/725; 375/240–240.29
See application file for complete search history.

(56) References Cited

U.S. PATENT DOCUMENTS

| | | |
|---|---|---|
| 2,911,462 A | 11/1959 | Brady |
| 3,793,489 A | 2/1974 | Sank |
| 3,909,121 A | 9/1975 | De Mesquita Cardoso |
| 4,400,724 A | 8/1983 | Fields |
| 4,494,144 A | 1/1985 | Brown |
| 4,750,123 A | 6/1988 | Christian |
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 5,003,532 A * | 3/1991 | Ashida et al. .............. 348/14.09 |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |

(Continued)

FOREIGN PATENT DOCUMENTS

CN      101953158 A      1/2011
(Continued)

OTHER PUBLICATIONS

U.S. Appl. No. 13/298,022, filed Nov. 16, 2011, entitled "System and Method for Alerting a Participant in a Video Conference," Inventor(s): TiongHu Lian, et al.

(Continued)

*Primary Examiner* — Curtis Kuntz
*Assistant Examiner* — Ryan Robinson
(74) *Attorney, Agent, or Firm* — Patent Capital Group

(57) ABSTRACT

Systems and methods for image processing, comprising receiving a video frame, coding a first portion of the video frame at a different quality than a second portion of the video frame, based on an optical property, and displaying the video frame.

17 Claims, 9 Drawing Sheets

U.S. PATENT DOCUMENTS

| | | |
|---|---|---|
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,625,410 A | 4/1997 | Washino et al. |
| 5,666,153 A | 9/1997 | Copeland |
| 5,675,374 A | 10/1997 | Kohda |
| 5,715,377 A | 2/1998 | Fukushima et al. |
| D391,935 S | 3/1998 | Sakaguchi et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,266,082 B1 | 7/2001 | Yonezawa et al. |
| 6,285,392 B1 | 9/2001 | Satoda et al. |
| 6,356,589 B1 | 3/2002 | Gebler et al. |
| 6,424,377 B1 | 7/2002 | Driscoll, Jr. |
| 6,430,222 B1 | 8/2002 | Okadia |
| 6,459,451 B2 * | 10/2002 | Driscoll et al. ............... 348/335 |
| 6,493,032 B1 | 12/2002 | Wallerstein et al. |
| 6,507,356 B1 | 1/2003 | Jackel et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,956 B1 | 7/2003 | Potts et al. |
| 6,611,281 B2 | 8/2003 | Strubbe |
| 6,680,856 B2 | 1/2004 | Schreiber |
| 6,704,048 B1 | 3/2004 | Malkin et al. |
| 6,710,797 B1 | 3/2004 | McNelley et al. |
| 6,751,106 B2 | 6/2004 | Zhang et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,844,990 B2 * | 1/2005 | Artonne et al. ............... 359/725 |
| 6,853,398 B2 | 2/2005 | Malzbender et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,080,157 B2 | 7/2006 | McCanne |
| 7,092,002 B2 | 8/2006 | Ferren et al. |
| 7,111,045 B2 | 9/2006 | Kato et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| D541,773 S | 5/2007 | Chong et al. |
| D542,247 S | 5/2007 | Kinoshita et al. |
| D545,314 S | 6/2007 | Kim |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D561,130 S | 2/2008 | Won et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 * | 7/2008 | Rondinelli ................... 359/868 |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,471,320 B2 | 12/2008 | Malkin et al. |
| 7,477,657 B1 | 1/2009 | Murphy et al. |
| D588,560 S | 3/2009 | Mellingen et al. |
| 7,518,051 B2 | 4/2009 | Redmann |
| D592,621 S | 5/2009 | Han |
| 7,532,230 B2 | 5/2009 | Culbertson et al. |
| 7,532,232 B2 | 5/2009 | Shah et al. |
| 7,545,761 B1 | 6/2009 | Kalbag |
| D602,453 S | 10/2009 | Ding et al. |
| 7,616,226 B2 | 11/2009 | Roessler et al. |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| D626,102 S | 10/2010 | Buzzard et al. |
| D626,103 S | 10/2010 | Buzzard et al. |
| D628,175 S | 11/2010 | Desai et al. |
| D628,968 S | 12/2010 | Desai et al. |
| 7,889,851 B2 | 2/2011 | Shah et al. |
| 7,894,531 B1 * | 2/2011 | Cetin et al. ............... 375/240.19 |
| D635,569 S | 4/2011 | Park |
| D635,975 S | 4/2011 | Seo et al. |
| 7,939,959 B2 | 5/2011 | Wagoner |
| 7,990,422 B2 | 8/2011 | Ahiska et al. |
| 8,000,559 B2 * | 8/2011 | Kwon ........................... 382/276 |
| 8,135,068 B1 * | 3/2012 | Alvarez et al. ........... 375/240.16 |
| 2001/0010555 A1 * | 8/2001 | Driscoll, Jr. ................. 348/335 |
| 2002/0106120 A1 | 8/2002 | Brandenburg et al. |
| 2002/0118890 A1 * | 8/2002 | Rondinelli ................... 382/276 |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2003/0048218 A1 | 3/2003 | Milnes et al. |
| 2003/0072460 A1 | 4/2003 | Gonopolskiy et al. |
| 2003/0149724 A1 | 8/2003 | Chang |
| 2003/0160861 A1 | 8/2003 | Barlow et al. |
| 2003/0179285 A1 | 9/2003 | Naito |

| | | |
|---|---|---|
| 2003/0185303 A1 | 10/2003 | Hall |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0218755 A1 | 11/2004 | Marton et al. |
| 2004/0246962 A1 | 12/2004 | Kopeikin et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0028983 A1 | 2/2006 | Wright |
| 2006/0056056 A1 | 3/2006 | Ahiska et al. |
| 2006/0066717 A1 | 3/2006 | Miceli |
| 2006/0082643 A1 | 4/2006 | Richards |
| 2006/0093128 A1 | 5/2006 | Oxford |
| 2006/0100004 A1 | 5/2006 | Kim et al. |
| 2006/0104470 A1 | 5/2006 | Akino |
| 2006/0120307 A1 | 6/2006 | Sahashi |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0256187 A1 | 11/2006 | Sheldon et al. |
| 2006/0284786 A1 | 12/2006 | Takano et al. |
| 2007/0039030 A1 | 2/2007 | Romanowich et al. |
| 2007/0070177 A1 | 3/2007 | Christensen |
| 2007/0080845 A1 | 4/2007 | Amand |
| 2007/0112966 A1 | 5/2007 | Eftis et al. |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0263079 A1 | 11/2007 | Graham et al. |
| 2008/0077390 A1 | 3/2008 | Nagao |
| 2008/0136896 A1 | 6/2008 | Graham et al. |
| 2008/0151038 A1 | 6/2008 | Khouri et al. |
| 2008/0208444 A1 | 8/2008 | Ruckart |
| 2008/0212677 A1 | 9/2008 | Chen et al. |
| 2008/0218582 A1 | 9/2008 | Buckler |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0051756 A1 | 2/2009 | Trachtenberg et al. |
| 2009/0122867 A1 | 5/2009 | Mauchly et al. |
| 2009/0174764 A1 | 7/2009 | Chadha et al. |
| 2009/0207233 A1 | 8/2009 | Mauchly et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0322082 A1 | 12/2009 | Wagoner |
| 2009/0324023 A1 | 12/2009 | Tian et al. |
| 2010/0118112 A1 | 5/2010 | Nimri et al. |
| 2010/0123770 A1 | 5/2010 | Friel et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0208078 A1 | 8/2010 | Tian et al. |
| 2010/0225732 A1 | 9/2010 | De Beer et al. |
| 2010/0277563 A1 | 11/2010 | Gupta et al. |
| 2010/0316232 A1 | 12/2010 | Acero et al. |
| 2011/0063467 A1 | 3/2011 | Tanaka |
| 2011/0085016 A1 | 4/2011 | Kristiansen et al. |

FOREIGN PATENT DOCUMENTS

| | | |
|---|---|---|
| CN | 102067593 | 5/2011 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO 2012/033716 | 3/2012 |
| WO | WO2012/033716 | 3/2012 |

OTHER PUBLICATIONS

PCT Sep. 13, 2011 International Preliminary Report on Patentability and the Written Opinion of the ISA from PCT/US2010/026456; 5 pages.

PCT Oct. 12, 2011 International Search Report and Written Opinion of the ISA from PCT/US2011/050380.

""Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html".

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,795, filed Apr. 28, 2011, entitled "System and Method for Providing Enhanced Eye Gaze in a Video Conferencing Enviroment," Inventors: Charles C. Byers.

U.S. Appl. No. 29/389,651, filed Apr. 14, 2011, entitled "Video Unit With Integrated Features," Inventor(s): Kyle A. Buzzard et al.

U.S. Appl. No. 29/389,654, filed Apr. 14, 2011, entitled "Video Unit With Integrated Features," Inventor(s): Kyle A. Buzzard et al.

Andreopoulos, Yiannis, et al., "In-Band Motion Compensated Temporal Filtering," Signal Processing: Image Communication 19 (2004) 653-673, 21 pages http://medianetiab.ee.ucla.edu/papers/011.pdf.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages http://www.cs.ubc.ca/~murphyk/Software/Kalman/ParticleFilterTutorial.pdf.

Boros, S., "Policy-Based Network Management with SNMP," Proceedings of the EUNICE 2000 Summer School Sep. 13-15, 2000, p. 3.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Dornaika F., et al., "Head and Facial Animation Tracking Using Appearance-Adaptive Models and Particle Filters," 20040627; 20040627-20040602, Jun. 27, 2004, 22 pages; HEUDIASY Research Lab, http://eprints.pascal-network.org/archive/00001231/01/rtvhci_chapter8.pdf.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages, http://iphome.hhi.de/eisert/papers/vcip03.pdf.

EPO Aug. 15, 2011 Response to EPO Communication mailed Feb. 25, 2011 from European Patent Application No. 09725288.6; 15 pages.

EPO Communication dated Feb. 25, 2011 for EP09725288.6 (published as EP22777308); 4 pages.

"Eye Tracking," from Wikipedia (printed on Aug. 31, 2011) 12 pages; http://en.wikipedia.org/wiki/Eye_tracker.

Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gussenhoven, Carlos, "Chapter 5 Transcription of Dutch Intonation," Nov. 9, 2003, 33 pages; http://www.ru.nl/publish/pages/516603/todisun-ah.pdf.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Liu, Shan, et al., "Bit-Depth Scalable Coding for High Dynamic Range Video," SPIE Conference on Visual Communications and Image Processing, Jan. 2008; 12 pages; http://www.merl.com/papers/docs/TR2007-078.pdf.

Nakaya, Y., et al. "Motion Compensation Based on Spatial Transformations," IEEE Transactions on Circuits and Systems for Video Technology, Jun. 1994, Abstract Only; http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=_203.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

PCT Sep. 25, 2007 Notification of Transmittal of the International Search Report from PCT/US06/45895.

PCT Sep. 2, 2008 International Preliminary Report on Patentability (1 page) and the Written Opinion of th ISA (4 pages) from PCT/US2006/045895.

PCT Sep. 11, 2008 Notification of Transmittal of the International Search Report from PCT/US07/09469.

PCT Nov. 4, 2008 International Preliminary Report on Patentability (1 page) and the Written Opinion of the ISA (8 pages) from PCT/US2007/009469.

PCT May 11, 2010 International Search Report from PCT/US2010/024059; 4 pages.

PCT Aug. 23, 2011 International Preliminary Report on Patentability and Written Opinion of the ISA from PCT/US2010/024059; 6 pages.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.

Veratech Corp., "Phantom Sentinel," © VeratechAero 2006, 1 page; http://www.veratechcorp.com/phantom.html.

Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

"Vocative Case," from Wikipedia, [retrieved and printed on Mar. 3, 2011] 11 pages; http://en.wikipedia.org/wiki/Vocative_case.

Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.

EPO Mar. 20, 2012 Communication from European Application 09725288.6; 6 pages.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

PCT Nov. 24, 2011 International Preliminary Report on Patentability from International Application PCT/US2010/033880; 6 pages.

U.S. Appl. No. 12/234,291, filed Sep. 19, 2008, entitled "System and Method for Enabling Communication Sessions in a Network Environment," Inventor(s): Yifan Gao et al.

U.S. Appl. No. 12/366,593, filed Feb. 5, 2009, entitled "System and Method for Depth Perspective image Rendering," Inventor(s): J. William Mauchly et al.

U.S. Appl. No. 12/475,075, filed May 29, 2009, entitled "System and Method for Extending Communications Between Participants in a Conferencing Environment," Inventor(s): Brian J. Baldino et al.

U.S. Appl. No. 12/400,540, filed Mar. 9, 2009, entitled "System and Method for Providing Three Dimensional Video Conferencing in a Network Environment," Inventor(s): Karthik Dakshinamoorthy et al.

U.S. Appl. No. 12/400,582, filed Mar. 9, 2009, entitled "System and Method for Providing Three Dimensional Imaging in a Network Environment," Inventor(s): Shmuel Shaffer et al.

U.S. Appl. No. 12/539,461, filed Aug. 11, 2009, entitled "System and Method for Verifying Parameters in an Audiovisual Environment," Inventor: James M. Alexander.

U.S. Appl. No. 12/463,505, filed May 11, 2009, entitled "System and Method for Translating Communications Between Participants in a Conferencing Environment," Inventor(s): Marthinus F. De Beer et al.

U.S. Appl. No. 12/727,089, filed Mar. 18, 2010, entitled "System and Method for Enhancing Video Images in a Conferencing Environment," Inventor: Joseph T. Friel.

U.S. Appl. No. 12/784,257, filed May 20, 2010, entitled "Implementing Selective Image Enhancement," inventors: Dihong Tian et al.

"3D Particles Experiments in AS3 and Flash CS3," printed Mar. 18, 2010, 2 pages; http://www.flashandmath.com/advanced/fourparticles/notes.html.

Active8-3D—Holographic Projection—3D Hologram Retail Display & Video Project, [retrieved Feb. 24, 2009], http://www.activ8-3d.co.uk/3d_holocubes, 1 page.

Avrithis, Y., et al., "Color-Based Retrieval of Facial Images," European Signal Processing Conference (EUSIPCO '00), Tampere, Finland; Sep. 2000; 18 pages.

Bakstein, Hynek, et al., "Visual Fidelity of Image Based Rendering," Center for Machine Perception, Czech Technical University, 10 pages.

Boccaccio, Jeff; CEPro, "Inside HDMI CEC: The Little-Known Control Feature," http://www.cepro.com/article/print/inside_hdml_cec_the_little_known_control_feature; Dec. 28, 2007, 2 pages.

Bücken R: "Bildfernsprechen: Videokonferenz vom Arbeitspiatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24; 3pgs.

Chen, Jason, "iBluetooth Lets iPhone Users Send and Receive Files Over Bluetooth," Mar. 13, 2009; 1 page; http://i.gizmodo.com/5169545/ibluetooth-lets-iphone-users-send-and-receive-files-over-bluetooth.

Cisco: Bill Mauchly and Mod Marathe; UNC: Henry Fuchs, et al., "Depth-Dependent Perspective Renderng," 6 pgs.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/criminis_techrep2003-59.pdf, 41 pages.

Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; pp. 443-447, ISBN: 978-0-8186-8821-8; XP010586786, 5 pages.

Diaz, Jesus, iPhone Bluetooth File Transfer Coming Soon (YES!); Jan. 25, 2009; 1 page; http://i.gizmodo.com/5138797/iphone-bluetooth-file-transfer-coming-soon-yes.

Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.

DVE Digital Video Enterprises, "DVE Tele-immersion Room," http://www.dvetelepresence.com/products/immersion_room.asp; 2009, 2 pgs.

"Dynamic Displays," copyright 2005-2008 [retrieved Feb. 24, 2009], http://www.zebraimaging.com/html/lighting_display.html, 2 pages.

ECmag.com, "IBS Products," Published Apr. 2009, 2 pages; http://www.ecmag.com/index.cfm§fa=article&articleID=10065.

Electrophysics Glossary, "Infrared Cameras, Thermal Imaging, Night Vision, Roof Moisture Detection," printed Mar. 18, 2010, 11 pages: http://www.electrophysics.com/Browse/Brw_Glossary.asp.

Farrukh, A., et al., Automated Segmentation of Skin-Tone Regions in Video Sequences, Proceedings IEEE Students Conference, ISCON_apos_02; Aug. 16-17, 2002, pp. 122-128, 7pgs.

Fiala, Mark, "Automatic Projector Calibration Using Self-Identifying Patterns," National Research Council of Canada, 2005; http://www.procams.org/procams2005/papers/procams05-36.pdf; 6 pages.

Freeman, Professor Wilson T., Computer Vision Lecture Slides, "6.869 Advances in Computer Vision: Learning and Interfaces," Spring 2005; 21 pages.

Gemmell, Jim et al., "Gaze Awareness for Video-conferencing: A Software Approach," IEEE MultiMedia, Oct.-Dec. 2000; 10 pages.

Gotchev, Atanas, "Computer Technologies for 3D Video Delivery for Home Entertainment," International Conference on Computer Systems and Technologies; CompSysTech '08: 6 pgs; http://ecet.ecs.ru.acad.bg/cst08/docs/cp/Plenary/P.1.pdf.

Gries, Dan, "3D Particles Experiments in AS3 and Flash CS3, Dan's Comments," printed May 24, 2010 http://www.flashandmath.com/advanced/fourparticles/notes.html; 3 pgs.

Guernsey, Lisa, "Toward Better Communication Across the Language Barrier," Jul. 29, 1999, http://www.nytimes.com/1999/07/29/technology/toward-better-communication-across-the-language-barrier.html; 2 pages.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-1097; XP011115755, 13 pages.

Holographic Imaging, "Dynamic Holography for scientific uses, military heads up display and even someday HoloTV Using TI's DMD," [retrieved Feb. 26, 2009], http://innovation.swmed.edu/research/instrumentation/res_inst_dev3d.html, 5 pages.

Hornbeck, Larry J., "Digital Light Processing™: A New MEMS-Based Display Technology," [retrieved Feb. 26, 2009]; http://focus.ti.com/pdfs/dipdmd/17_Digital_Light_Processing_MEMS_display_technology.pdf, 22 pages.

"Infrared Cameras TVS-200-EX," printed May 24, 2010; 2 pgs.; http://www.electrophysics.com/Browse/Brw_ProductLineCategory.asp§CategoryID=184&Area=IS.

IR Distribution Category @ Envious Technology, "IR Distribution Category," 2 pages http://www.envioustechnology.com.au/products/product-list.php§CID=305, printed on Apr. 22, 2009.

IR Trans—Products and Orders—Ethernet Devices, 2 pages http://www.irtrans.de/en/shop/Ian.php, printed on Apr. 22, 2009.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303; 16 pages.

Itoh, Hiroyasu, et al., "Use of a gain modulating framing camera for time-resolved imaging of cellular phenomena," SPIE vol. 2979, 1997, pp. 733-740; 8 pages.

Kauff, Peter, et al., "An Immersive 3D Video-Conferencing System Using Shared Virtual Team User Environments," Proceedings of the 4th international Conference on Collaborative Virtual Environments, XP040139458; Sep. 30, 2002; 8 pages.

Kazutake, Uehira, "Simulation of 3D image depth perception in a 3D display using two stereoscopic displays at different depths," http://absabs.harvard.edu/abs/2006SPIE.6055.408U; 2006, 2 pgs.

Keijser, Jeroen, et al., "Exploring 3D Interaction in Alternate Control-Display Space Mappings," IEEE Symposium on 3D User interfaces, Mar. 10-11, 2007, pp. 17-24; 8 pages.

Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.

Koyama, S., et al. "A Day and Night Vision MOS Imager will Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp/stamp.jsp§tp=&arnumber=4455782&isnumber=44 55723.

Lawson, S., "Cisco Plans TelePresence Translation Next Year," Dec. 9, 2008; http://www.pcworld.com/ article/155237/.html§tk=rss_news; 2 pages.

Miller, Gregor, et al., "Interactive Free-Viewpoint Video," Centre for Vision, Speech and Signal Processing, [retrieved Feb. 26, 2009], http://www.ee.surrey.ac.uk/CVSSP/VMRG/ Publications/miller05cvmp.pdf, 10 pages.

"Minoru from Novo is the worlds first consumer 3D Webcam," Dec. 11, 2008 [retrieved Feb. 24, 2009], http://www.minoru3d.com, 4 pages.

Mitsubishi Electric Research Laboratories, copyright 2009 [Retrieved Feb. 26, 2009], http://www.merl.com/projects/3dtv, 2 pages.

National Training Systems Association Home—Main, Interservice/Industry Training, Simulation & Education Conference, Dec. 1-4, 2008 [retrieved Feb. 26, 2009], http://ntsa.metapress.com/app/home/main.asp?referrer=default, 1 page.

OptoIQ, "Anti-Speckle Techniques Uses Dynamic Optics," Jun. 1, 2009, 2 pages; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html.

OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daily-product-2/2009/01/smart-camera-supports-multiple-interfaces.html.

OptoIQ, "Vision + Automation Products—VideometerLab 2," 11 pgs.; http://www.optoiq.com/optoiq-2/en-us/index/machine-vision-imaging-processing/display/vsd-articles-tools-template-articles.vision-systems-design.volume-11.issue10.departments.new-products.vision-automation-products.htmlhtml.

OptoIQ, "Vision Systems Design—Machine Vision and Image Processing Technology," printed Mar. 18, 2010, 2 pages; http://www.optoiq.com/index/machine-vision-imaging-processing.html.

PCT Notification of Transmittal of the International Search Report and the Written Opinion of the International Searching Authority, or the Declaration; PCT/US2009/038310; dated Oct. 10, 2009; 19 pages.

Radhika, N., et al., "Mobile Dynamic reconfigurable Context aware middleware for Adhoc smart spaces," vol. 22, 2008, 3 pages http://www.acadjournal.com/2008/V22/part6/p7.

"Rayvel Business-to-Business Products," copyright 2004 [retrieved Feb. 24, 2009], http://www.rayvel.com/b2b.html, 2 pages.

"Robust Face Localisation Using Motion, Colour & Fusion" Dec. 10, 2003; Proc. VIIth Digital Image Computing: Techniques and Applications, Sun C. et al (Eds.), Sydney; 10pgs.; Retrieved from the Internet: http://www.cmis.csiro.au/Hugues.Talbot/dicta2003/cdrom/pdf/0899.pdf; pages 899-908, XP007905630.

School of Computing, "Bluetooth over IP for Mobile Phones," 1 page http://www.computing.dcu.ie/wwwadmin/fyp-abstract/list/fyp_details05.jsp?year=2005&number=51470574.

SENA "Industrial Bluetooth," 1 page http://www.sena.com/products/industrial_bluetooth, printed on Apr. 22, 2009.

Shaffer, Shmuel, "Translation—State of the Art" presentation; Jan. 15, 2009; 22 pages.

Shi, C. et al., "Automatic Image Quality Improvement for Videoconferencing," IEEE ICASSP © 2004, 4 pgs.

Smarthome, "IR Extender Expands Your IR Capabilities," 3 pages http://www.smarthome.com/8121.html, printed Apr. 22, 2009.

Soohuan, Kim, et al., "Black-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN; 0277-786X; pp. 78-88; XP007905596; 11 pgs.

"Super Home Inspectors or Super Inspectors," printed Mar. 18, 2010, 3 pages; http://www.umrt.com/PageManager/Default.aspx/PageID=2120325.

Total immersion, Video Gallery, copyright 2008-2009 [retrieved Feb. 26, 2009], http://www.t-immersion.com/en,video-gallery,36.html, 1 page.

Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/papers/VidReg-final.pdf.

Tsapatsoulis, N., et al., "Face Detection for Multimedia Applications," Proceedings of the ICIP '00; Vancouver, BC, Canada; Sep. 2000: 4 pages.

Tsapatsoulis, N., et al., "Face Detection in Color Images and Video Sequences," $10^{th}$ Mediterranean Electrotechnical Conference (MELECON), 2000; vol. 2; pp. 498-502; 21 pgs.

Wang, Hualu, et al., "A Highly Efficient System for Automatic Face Region Detection in MPEG Video," IEEE Transactions on Circuits and Systems for Video Technology; vol. 7, Issue 4; 1977 pp. 615-628.

Wilson, Mark, "Dreamoc 3D Display Turns Any Phone Into Hologram Machine," Oct. 30, 2008 [retrieved Feb. 24, 2009], http://gizmodo.com/5070906/dreamoc-3d-display-turns-any-phone-into-hologram-machine, 2 pages.

WirelessDevNet, Melody Launches Bluetooth Over IP, http://www.wirelessdevnet.com/news/2001/ 155/news5.html; 2 pages, printed on Jun. 5, 2001.

WO 2008/118887 A3 Publication with PCT International Search Report (4 pages), International Preliminary Report on Patentability (1 page), and Written Opinion of the ISA (7 pages); PCT/US2008/058079; dated Sep. 18, 2008.

Yang, Jie, et al., "A Real-Time Face Tracker," Proceedings $3^{rd}$ IEEE Workshop on Applications of Computer Vision; 1996; Dec. 2-4, 1996; pp. 142-147; 6pgs.

Yang, Ming-Hsuan, et al., "Detecting Faces in Images: A Survey," vol. 24, No. 1; Jan. 2002; pp. 34-58; 25 pgs.

Yang, Ruigang, et al., "Real-Time Consensus-Based Scene Reconstruction using Commodity Graphics Hardware," Department of Computer Science, University of North Carolina at Chapel Hill, 10 pgs.

Yoo, Byounghun, et al., "Image-Based Modeling of Urban Buildings Using Aerial Photographs and Digital Maps," Transactions in GIS, vol. 10 No. 3, p. 377-394, 2006; 18 pages. [retrieved May 17, 2010], http://icad.kaist.ac.kr/publication/paper_data/image_based.pdf.

U.S. Appl. No. 12/781,722, filed May 17, 2010, entitled "System and Method for Providing Retracting Optics in a Video Conferencing Environment," Inventor(s): Joseph T. Friel, et al.

U.S. Appl. No. 12/877,833, filed Sep. 8, 2010, entitled "System and Method for Skip Coding During Video Conferencing in a Network Environment," Inventor(s): Dihong Tian, et al.

U.S. Appl. No. 12/870,687, filed Aug. 27, 2010, entitled "System and Method for Producing a Performance Via Video Conferencing in a Network Environment," Inventor(s): Michael A. Arnao et al.

U.S. Appl. No. 12/912,556, filed Oct. 26, 2010, entitled "System and Method for Provisioning Flows in a Mobile Network Environment," Inventors: Balaji Vankat Vankataswami, et al.

U.S. Appl. No. 12/949,614, filed Nov. 18, 2010, entitled "System and Method for Managing Optics in a Video Environment," Inventors: Torence Lu, et al.

U.S. Appl. No. 12/873,100, filed Aug. 31, 2010, entitled "System and Method for Providing Depth Adaptive Video Conferencing," Inventor(s): J. William Mauchly et al.

U.S. Appl. No. 12/946,679, filed Nov. 15, 2010, entitled "System and Method for Providing Camera Functions in a Video Environment," Inventors: Peter A.J. Fornell, et al.

U.S. Appl. No. 12/946,695, filed Nov. 15, 2010, entitled "System and Method for Providing Enhanced Audio in a Video Environment," Inventors: Wei Li, et al.

U.S. Appl. No. 12/907,914, filed Oct. 19, 2010, entitled "System and Method for Providing Videomail in a Network Environment," Inventors; David J. Mackie et al.

U.S. Appl. No. 12/950,786, filed Nov. 19, 2010, entitled "System and Method for Providing Enhanced Video Processing in a Network Environment," Inventor(s): David J. Mackie.

U.S. Appl. No. 12/907,919, filed Oct. 19, 2010, entitled "System and Method for Providing Connectivity in a Network Environment," Inventors: David J. Mackie et al.

U.S. Appl. No. 12/946,704, filed Nov. 15, 2010, entitled "System and Method for Providing Enhanced Graphics in a Video Environment," Inventors: John M. Kanalakis, Jr., et al.

U.S. Appl. No. 12/957,116, filed Nov. 30, 2010, entitled "System and Method for Gesture Interface Control," Inventors: Shuan K. Kirby, et al.

U.S. Appl. No. 12/907,925, filed Oct. 19, 2010, entitled "System and Method for Providing a Pairing Mechanism in a Video Environment," Inventors: Gangfeng Kong et al.

U.S. Appl. No. 12/939,037, filed Nov. 3, 2010, entitled "System and Method for Managing Flows in a Mobile Network Environment," Inventors: Balaji Venkataswami et al.

U.S. Appl. No. 12/946,709, filed Nov. 15, 2010, entitled "System and Method for Providing Enhanced Graphics in a Video Environment," Inventors: John M. Kanalakis, Jr., et al.

U.S. Appl. No. 29/375,624, filed Sep. 24, 2010, entitled "Mounted Video Unit," Inventor(s): Ashok T. Desai et al.

U.S. Appl. No. 29/375,627, filed Sep. 24, 2010, entitled "Mounted Video Unit," Inventor(s): Ashok T. Desai et al.

U.S. Appl. No. 29/369,951, filed Sep. 15, 2010, entitled "Video Unit With Integrated Features," Inventor(s): Kyle A. Buzzard et al.

U.S. Appl. No. 29/375,458, filed Sep. 22, 2010, entitled "Video Unit With Integrated Features," Inventor(s): Kyle A. Buzzard et al.

U.S. Appl. No. 29/375,619, filed Sep. 24, 2010, entitled "Free-Standing Video Unit," Inventor(s): Ashok T. Desai et al.

U.S. Appl. No. 29/381,245, filed Dec. 16, 2010, entitled "Interface Element," Inventor(s): John M. Kanalakis, Jr., et al.

U.S. Appl. No. 29/381,250, filed Dec. 16, 2010, entitled "Interface Element," Inventor(s): John M. Kanalakis, Jr., et al.

U.S. Appl. No. 29/381,254, filed Dec. 16, 2010, entitled "Interface Element," Inventor(s): John M. Kanalakis, Jr., et al.

U.S. Appl. No. 29/381,256, filed Dec. 16, 2010, entitled "Interface Element," Inventor(s): John M. Kanalakis, Jr., et al.

U.S. Appl. No. 29/381,259, filed Dec. 16, 2010, entitled "Interface Element," Inventor(s): John M. Kanalakis, Jr., et al.

U.S. Appl. No. 29/381,260, filed Dec. 16, 2010, entitled "Interface Element," Inventor(s): John M. Kanalakis, Jr., et al.

U.S. Appl. No. 29/381,262, filed Dec. 16, 2010, entitled "Interface Element," Inventor(s): John M. Kanalakis, Jr., et al.

U.S. Appl. No. 29/381,264, filed Dec. 16, 2010, entitled "Interface Element," Inventor(s): John M. Kanalakis, Jr., et al.

3G, "World's First 3G Video Conference Service with New TV Commercial," Apr. 28, 2005, 4 pages; http://www.3g.co.uk/PR/April2005/1383.htm.

Andersson, L., et al., ""LDP Specification,"" Network Working Group, RFC 3036, Jan. 2001, 133 pages; http://tools.ietf.org/html/rfc3036.

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-ids/draft-berzin-malis-mpls-mobility-01.txt.

Chen, Qing, et al., "Real-time Vision-based Hand Gesture Recognition Using Haar-like Features," Instrumention and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.1.93.103%26rep%3Drep1%26type%3Dpdf&ei=A28RTLKRDeftnQeXzZGRAw&usg=AFQjCNHpwj5MwjgGp-3goVzSWad6CO-jzw.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

Digital Video Enterprises, "DVE Eye Contact Silhouette," 1 page, © DVE 2008; http://www.dvetelepresence.com/products/eyeContactSilhouette.asp.

Gluckman, Joshua, et al., "Rectified Catadioptric Stereo Sensors," 8 pages, retrieved and printed on May 17, 2010; http://cis.poly.edu/~gluckman/papers/cvpr00.pdf.

Gundavelli, S., et al., "Proxy Mobile IPv6," Network Working Group, RFC 5213, Aug. 2008, 93 pages; http://tools.ietf.org/pdf/rfc5213.pdf.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Koilarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

PCT "Notification of Transmittal of the International Search Report and the Written Opinion of the International Searching Authority, or the Declaration," PCT/US2009/001070, dated Apr. 4, 2009, 17 pages.

PCT International Preliminary Report on Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability dated May 15, 2006, for PCT International Application PCT/US2004/021585, 6 pages.

PCT International Search Report mailed Aug. 24, 2010 for PCT/US2010033880, 4 pages.

PCT Notification of Transmittal of the International Search Report and the Written Opinion of the International Searching Authority, or the Declaration; PCT/US2010/26456; dated Jun. 29, 2010.

"Real-time Hand Motion/Gesture Detection for HCI-Demo 2," video clip, YouTube, posted Dec. 17, 2008 by smmy0705, 1 page; www.youtube.com/watch?v=mLT4CFLll8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Trevor Darrell, "A Real-Time Virtual Mirror Display," 1 page, Sep. 9, 1998; http://people.csail.mit.edu/trevor/papers/1998-021/node6.html.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeitset on Mar. 31, 2010, 1 page; http://www.youtube.com/watch?v=JOXwjkWP6Sw.

"Wi-Fi Protected Setup," from Wikipedia, Sep. 2, 2010, 3 pages http://en.wikipedia.org/wiki/Wi-Fi_Protected_Setup.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/OB22LFIS1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Unclerkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"G-stalt version 1," video clip, YouTube.com, posted by ziggles on Mar. 15, 2009, 1 page; http://youtube.com/watch?v=k8ZAql4mdvk.

Underkoffler, John, "Cariton Sparrell speaks at MIT," Oblong Industries, Inc. Web Log, Oct. 30, 2009, 1 page; http://oblong.com/article/09usAB411Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/281182.

Feld, Brad, "Science Fact," Oblong Industries, Inc. Web Log, Nov. 13, 2008, 2 pages,http://oblong.com/article/084H-PKI5Tb9l4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages, http://oblong.com/article/086E19gPvDcktAf9.html.

Arrington, Michael,"eJamming—Distributed Jamming," TechCrunch; Mar. 16, 2006; http://www.techcrunch.com/2006/03/16/ejamming-distributed-jamming/: 1 page.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Chan et al., "Experiments on Block-Matching Techniques for Video Coding," Multimedia Systems, vol. 2, 1994, pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.isi.psu.edu/viewdoc/summary?doi=10.1.1.35.1287.

"Cisco Expo German 2009 Opening," Posted on YouTube on May 4, 2009; http://www.youtube.com/watch?v=SDKsaSlz4MK: 2 pages.

eJamming Audio, Learn More; [retrieved and printed on May 27, 2010]http://www.ejamming.com/learnmore/; 4 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1.php; 4 pages.

Guili, D. et al., "Orchestral: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=&arnumber=778626; 2 pages.

He, L., et al., "The Virtual Cinematographer: A Paradigm for Automatic Real-Time Camera Control and Directing," SIGGRAPH, © 1996; http://research.microsoft.com/en-us/um/people/the/papers/siggraph96.vc.pdf; 8 pages.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Langrangian Cost Estimastion," IEEE Transactions on Circuits and Systems for Video Technology, vol. 16, No. 2, Feb. 2006; www.rgu.ac.uk/files/h264_skippredict_richardson_final.pdf; 20 pages.

Kim, Y.H., et al., "Adaptive mode decision for H.264 encoder," Electronics letters, vol. 40, Issue 19, pp. 1172-1173, Sep. 2004; 2 pages.

Lee, J. and Jean, B., "Fast Mode Decision for H.264," ISO/IEC MPEG and ITU-T VCEG Joint Video Team, Doc. JVT-J033, Dec. 2003; http://media.skku.ac.kr/publications/paper/lnlC/ljy_ICME2004.pdf; 4 pages.

Liu, Z., "Head-Size Equalization for Better Visual Perception of Video Conferencing," Proceedings, IEEEinternational Conference on Multimedia & Expo (ICME2005), Jul. 6-8, 2005, Amsterdam, The Netherlands; http://research.microsoft.com/users/cohen/HeadSizeEqualizationCME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Payatagool, Chris, "Orchestral Manoeuvres in the Light of Telepresence," Telepresence Options, Nov. 12, 2008; http://www.telepresenceoptions.com/2008/11/orchrestal_manoeuvres; 2pages.

PCT "International Search Report and the Written Opinion of the International Searching Authority, or the Declaration," PCT/US2010/026456, dated Jun. 29, 2010, 11 pages.

PCT Search Report for PCT Application No. PCT/US2009/064061 dated Feb. 11, 2010, 4 pages.

PCT Written Opinion for PCT Application No. PCT/US2009/064061 dated Feb. 23, 2010; 14 pages.

Pixel Tools "Rate Control and H.264: H.264 rate control algorithm dynamically adjusts encoder parameters,"[retrieved and printed on Jun. 10, 2010] http://www.pixeltools.om/rate_control_paper.html; 7 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estimation_pcs06.pdf; 6 pages.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

Schum, H.-Y. et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rafflink. [retrieved and printed on Jun. 2, 2010] http://www.sonomawireworks.com/rifflink.php; 3 pages.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

EPO Jul. 10, 2012 Response to EP Communication from European Application EP10723445.2; 3 pages.

EPO Sep. 24, 2012 Response to EP Communication from European Application EP09725288.6; 15 pages.

Chien, et al., "Efficient moving Object Segmentation Algorithm Using Background Registration Technique," IEEE Transactions on Circuits and Systems for Video Technology, vol. 12, No. 7, Jul. 2002, 10 pages.

EPO Nov. 3, 2011 Communication from European Application EP10710949.8; 2 pages.

EPO Mar. 12, 2012 Response to EP Communication dated Nov. 3, 2011 from European Application EP10710949.8; 15 pages.

EPO Mar. 3, 2012 Communication from European Application 09725288.6; 6 pages.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

PCT Nov. 24, 2012 International Preliminary Report on Patentability from International Application Serial No. PCT/US2010/033880; 6 pages.

PCT Jan. 23, 2012 International Search Report and Written Opinion of the ISA from International Application Serial No. PCT/US2011/060579; 10 pages.

PCT Jan. 23, 2012 International Search Report and Written Opinion of the ISA from International Application Serial No. PCT/US2011/060584; 11 pages.

PCT Feb. 20, 2012 International Search Report and Written Opinion of the ISA from International Application Serial No. PCT/US2011/061442; 12 pages.

* cited by examiner

US 8,355,041 B2

TELEPRESENCE SYSTEM FOR 360 DEGREE VIDEO CONFERENCING

TECHNICAL FIELD

The invention generally relates to telecommunications and more specifically to video conferencing.

BACKGROUND

Telepresence systems, featured by the life-size, high definition (HD) video and stereo quality audio, provide a lifelike face-to-face interaction experience to people who are at distances. It delivers a unique, "in-person" experience over the converged network. Using advanced visual, audio, and collaboration technologies, these "Telepresence" applications deliver real-time, face-to-face interactions between people and places in their work and personal lives. In some cases, these products use a room-within-a-room environment along with life-size images, and high-definition resolution with spatial and discrete audio to create a live, face-to-face meeting around a single "virtual" table.

A drawback of current Telepresence systems is the inability to provide a 360° view of the participants in a conference room. In current systems all the participants in the conference have to be located on the same side facing the camera. If there is a round-table conference and the participants are spread all around the table, the cameras just offer one view and do not offer a 360° view of all the participants in the conference.

Also, in current systems these "virtual" meeting rooms have to be specifically arranged for Telepresence functionality. Typically the arrangements force all the local participants to sit in a row, with cameras and displays opposite them. This typical arrangement cuts the room in half and makes it suitable only for Telepresence.

Therefore, it is desirable to have a multipoint conference system where local participants are able to sit around a conference table, as they would naturally. New approaches are needed in three areas, 1) room, camera and display arrangements; 2) Image capture and presentation techniques, and 3) Image and data processing specifically to support a 360° view.

SUMMARY

Described herein are embodiments of systems and methods for image processing in a Telepresence system. In one embodiment, the methods can comprise receiving a video frame, coding a first portion of the video frame at a different quality than a second portion of the video frame, based on an optical property, and displaying the video frame.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, which are incorporated in and constitute a part of this specification and are not drawn to scale, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Exemplary" as used herein means "an example of" and is not meant to convey a sense of an ideal or preferred embodiment.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the Examples included therein and to the Figures and their previous and following description.

Figure 1:
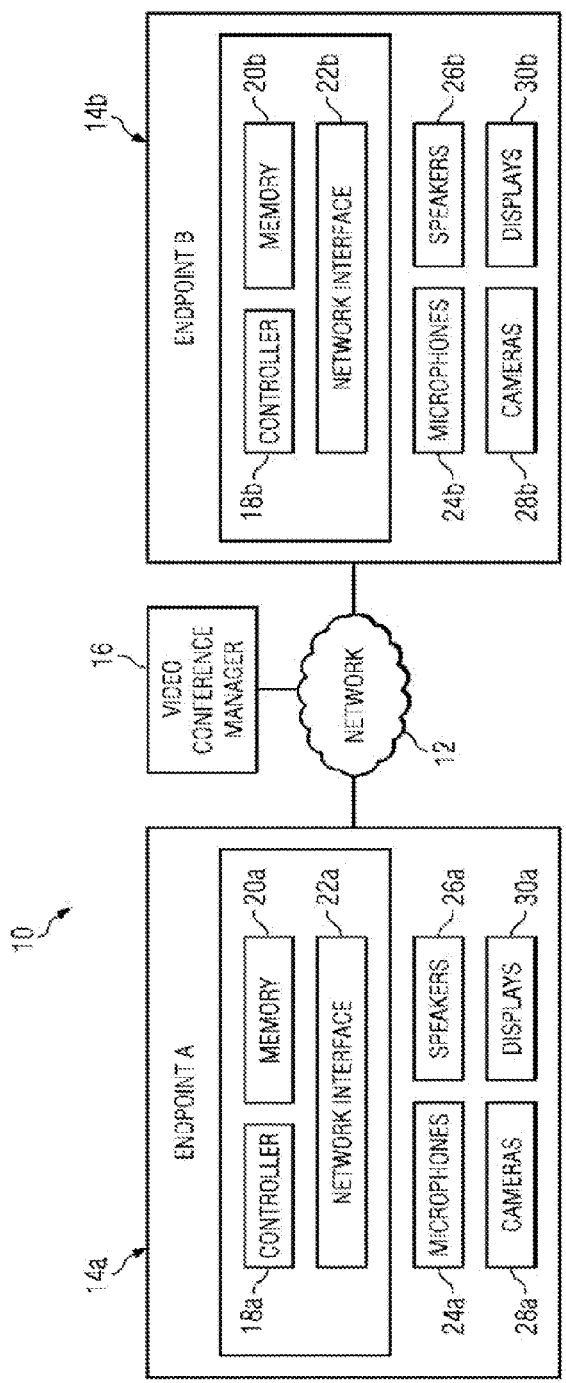
FIG. 1 illustrates a communications system that includes two endpoints engaged in a video conference.

FIG. 1 illustrates a communications system, indicated generally at 10, that includes two endpoints engaged in a video conference. As illustrated, communications system 10 includes network 12 connecting endpoints 14 and a videoconference manager 16. While not illustrated, communications system 10 may also include any other suitable elements to facilitate video conferences.

In general, during a video conference, a display at a local endpoint 14 is configured to concurrently display multiple video streams of a remote endpoint 14. These video streams may each include an image of the remote endpoint 14 as seen from different angles or perspectives. In some instances, positions at the local endpoints can be unoccupied or the camera angle may not be optimized for participants in occupied positions. By reconfiguring cameras at a local endpoint, images of empty positions can be prevented and participant gaze can be improved, which may result in a more realistic video conferencing experience.

Network 12 interconnects the elements of communications system 10 and facilitates video conferences between endpoints 14 in communications system 10. While not illustrated, network 12 may include any suitable devices to facilitate communications between endpoints 14, videoconference manager 16, and other elements in communications system 10. Network 12 represents communication equipment including hardware and any appropriate controlling logic for interconnecting elements coupled to or within network 12. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network. Network 12 may include any combination of gateways, routers, hubs, switches, access points, base stations, and any other hardware or software implementing suitable protocols and communications.

Endpoints 14 (or just "points") represent telecommunications equipment that supports participation in video conferences. A user of communications system 10 may employ one of endpoints 14 in order to participate in a video conference with another one of endpoints 14 or another device in communications system 10. In particular embodiments, endpoints 14 are deployed in conference rooms at geographically remote locations. Endpoints 14 may be used during a video conference to provide participants with a seamless video conferencing experience that aims to approximate a face-to-face meeting. Each endpoint 14 may be designed to transmit and receive any suitable number of audio and/or video streams conveying the sounds and/or images of participants at that endpoint 14. Endpoints 14 in communications system 10 may generate any suitable number of audio, video, and/or data streams and receive any suitable number of streams from other endpoints 14 participating in a video conference. Moreover, endpoints 14 may include any suitable components and devices to establish and facilitate a video conference using any suitable protocol techniques or methods. For example, Session Initiation Protocol (SIP) or H.323 may be used. Additionally, endpoints 14 may support and be inoperable with other video systems supporting other standards such as H.261, H.263, and/or H.264, as well as with pure audio telephony devices. As illustrated, endpoints 14 include a controller 18, memory 20, network interface 22, microphones 24, speakers 26, cameras 28, and displays 30. Also, while not illustrated, endpoints 14 may include any other suitable video conferencing equipment, for example, a speaker phone, a scanner for transmitting data, and a display for viewing transmitted data.

Controller 18 controls the operation and administration of endpoint 14. Controller 18 may process information and signals received from other elements such as network interface 22, microphones 24, speakers 26, cameras 28, and displays 30. Controller 18 may include any suitable hardware, software, and/or logic. For example, controller 18 may be a programmable logic device, a microcontroller, a microprocessor, a processor, any suitable processing device, or any combination of the preceding. Memory 20 may store any data or logic used by controller 18 in providing video conference functionality. In some embodiments, memory 20 may store all, some, or no data received by elements within its corresponding endpoint 14 and data received from remote endpoints 14. Memory 20 may include any form of volatile or non-volatile memory including, without limitation, magnetic media, optical media, random access memory (RAM), read-only memory (ROM), removable media, or any other suitable local or remote memory component. Network interface 22 may communicate information and signals to and receive information and signals from network 12. Network interface 22 represents any port or connection, real or virtual, including any suitable hardware and/or software that allow endpoint 14 to exchange information and signals with network 12, other endpoints 14, videoconference manager 16, and/or any other devices in communications system 10.

Microphones 24 and speakers 26 generate and project audio streams during a video conference. Microphones 24 provide for audio input from users participating in the video conference. Microphones 24 may generate audio streams from received sound waves. Speakers 26 may include any suitable hardware and/or software to facilitate receiving audio stream(s) and projecting the received audio stream(s) so that they can be heard by the local participants. For example, speakers 26 may include high-fidelity speakers. Endpoint 14 may contain any suitable number of microphones 24 and speakers 26, and they may each be associated with any suitable number of participants.

Cameras 28 and displays 30 generate and project video streams during a video conference. Cameras 28 may include any suitable hardware and/or software to facilitate capturing an image of one or more local participants and the surrounding area as well as sending the image to remote participants. Each video signal may be transmitted as a separate video stream (e.g., each camera 28 transmits its own video stream). In particular embodiments, cameras 28 capture and transmit the image of one or more users 30 as a high-definition video signal. Displays 30 may include any suitable hardware and/or software to facilitate receiving video stream(s) and displaying the received video streams to participants. For example, displays 30 may include a notebook PC, a wall mounted monitor, a floor mounted monitor, or a free standing monitor. In particular embodiments, one or more of displays 30 are plasma display devices or liquid crystal display devices. Endpoint 14 may contain any suitable number of cameras 28 and displays 30, and they may each be associated with any suitable number of local participants.

While each endpoint 14 is depicted as a single element containing a particular configuration and arrangement of modules, it should be noted that this is a logical depiction, and the constituent components and their functionality may be performed by any suitable number, type, and configuration of devices. In the illustrated embodiment, communications system 10 includes two endpoints 14a, 14b, but it is to be understood that communications system 10 may include any suitable number of endpoints 14.

Videoconference manager 16 generally coordinates the initiation, maintenance, and termination of video conferences between endpoints 14. Video conference manager 16 may obtain information regarding scheduled video conferences and may reserve devices in network 12 for each of those conferences. In addition to reserving devices or resources prior to initiation of a video conference, videoconference manager may monitor the progress of the video conference and may modify reservations as appropriate. Also, video conference manager 16 may be responsible for freeing resources after a video conference is terminated. Although video conference manager 16 has been illustrated and described as a single device connected to network 12, it is to be understood that its functionality may be implemented by any suitable number of devices located at one or more locations in communication system 10.

In an example operation, one of endpoints 14a, 14b initiates a video conference with the other of endpoints 14a, 14b. The initiating endpoint 14 may send a message to video conference manager 16 that includes details specifying the time of, endpoints 14 to participate in, and estimated duration of the desired video conference. Video conference manager 16 may then reserve resources in network 12 and may facilitate the signaling required to initiate the video conference between endpoint 14a and endpoint 14b. During the video conference, endpoints 14a, 14b may exchange one or more audio streams, one or more video streams, and one or more data streams. In particular embodiments, endpoint 14a may send and receive the same number of video streams as endpoint 14b. In certain embodiments, each of endpoints 14a, 14b send and receive the same number of audio streams and video streams. In some embodiments, endpoints 14a, 14b send and receive more video streams than audio streams.

During the video conference, each endpoint 14a, 14b may generate and transmit multiple video streams that provide different perspective-dependent views to the other endpoint 14a, 14b. For example, endpoint 14a may generate three video streams that each provide a perspective-dependent view of participants at endpoint 14a. These may show the participants at endpoint 14a from three different angles, e.g., left, center, and right. After receiving these video streams, endpoint 14b may concurrently display these three video streams on a display so that participants situated to the left of the display view one of the video streams, while participants situated directly in front of the display view a second of the video streams. Likewise, participants situated to the right of the display may view the third of the video streams. Accordingly, endpoint 14b may display different perspective-dependent views of remote participants to local participants. By providing different images to different participants, local participants may be able to more easily interpret the meaning of certain nonverbal clues (e.g., eye gaze, pointing) while looking at a two-dimensional image of a remote participant.

When the participants decide that the video conference should be terminated, endpoint 14a or endpoint 14b may send a message to video conference manager 16, who may then un-reserve the reserved resources in network 12 and facilitate signaling to terminate the video conference. While this video conference has been described as occurring between two endpoints—endpoint 14a and endpoint 14b—it is to be understood that any suitable number of endpoints 14 at any suitable locations may be involved in a video conference.

An example of a communications system with two endpoints engaged in a video conference has been described. This example is provided to explain a particular embodiment and is not intended to be all inclusive. While system 10 is depicted as containing a certain configuration and arrangement of elements, it should be noted that this is simply a logical depiction, and the components and functionality of system 10 may be combined, separated and distributed as appropriate both logically and physically. Also, the functionality of system 10 may be provided by any suitable collection and arrangement of components.

Figure 2A:
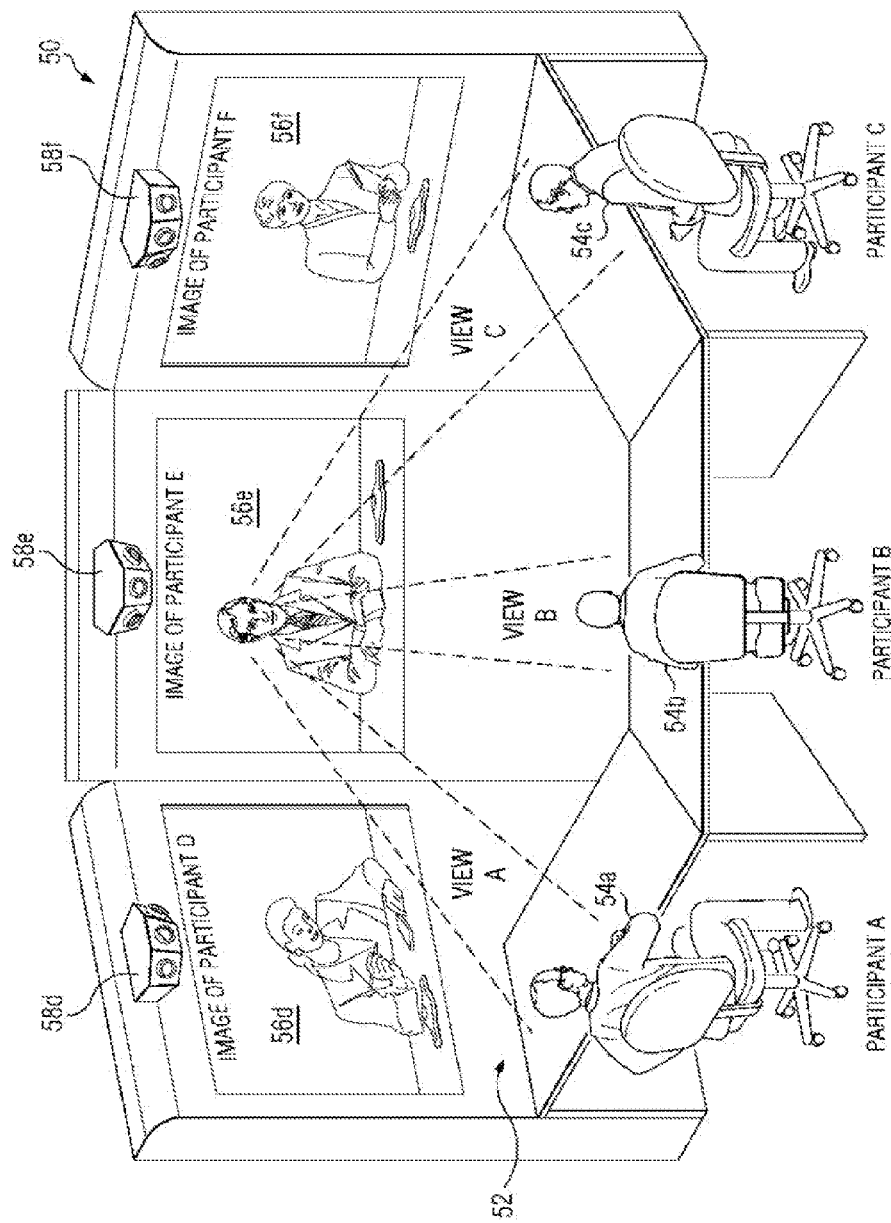
FIGS. 2a-2b illustrate endpoints that use cameras and multiple view display devices to concurrently provide local participants with perspective-dependent views of remote participants.
Figure 2B:
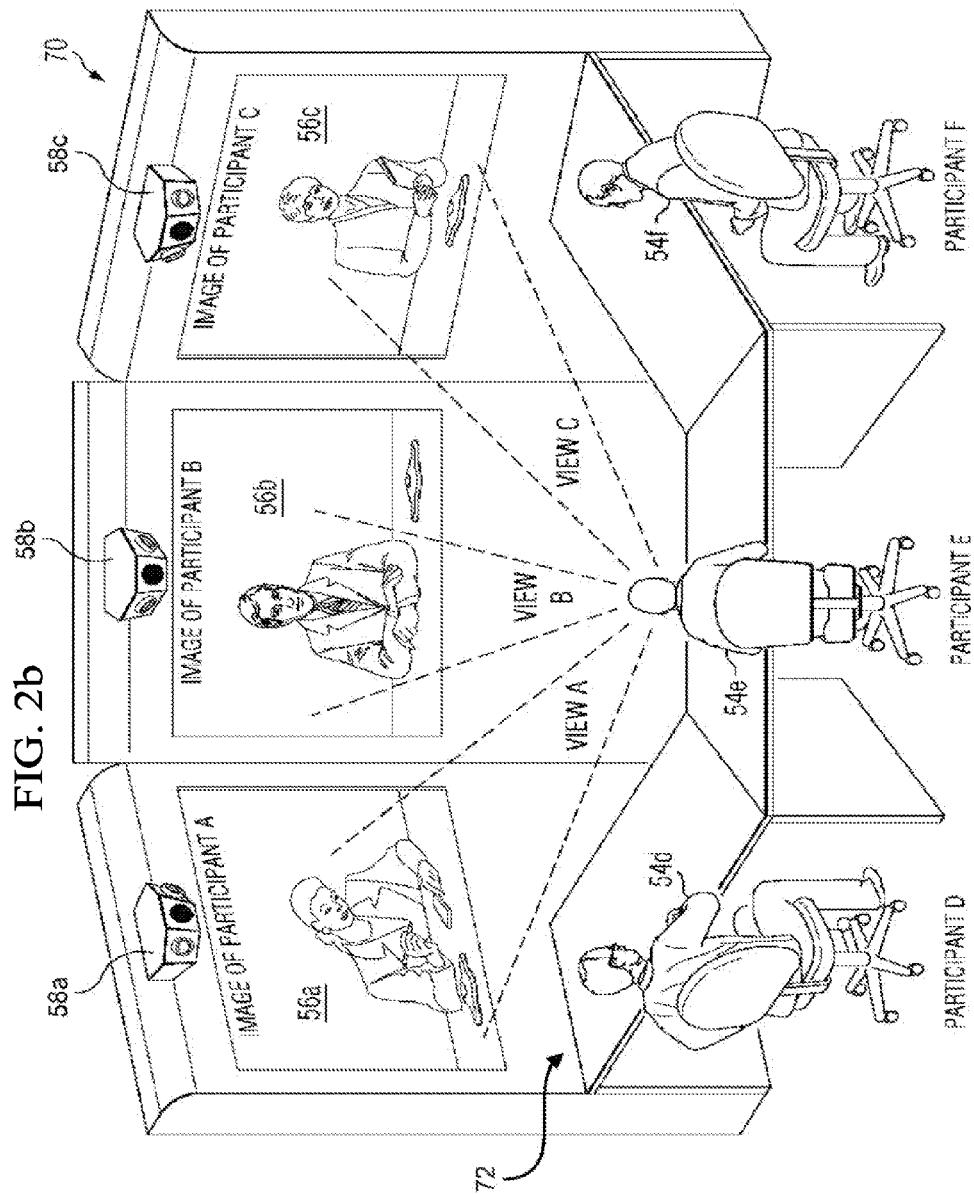

FIG. 2a and FIG. 2b illustrate endpoints, indicated generally at 50 and 70, that use cameras and multiple view display devices to concurrently provide local participants with perspective-dependent views of remote participants. As used throughout this disclosure, "local" and "remote" are used as relational terms to identify, from the perspective of a "local" endpoint, the interactions between and operations and functionality within multiple different endpoints participating in a video conference. Accordingly, the terms "local" and "remote" may be switched when the perspective is that of the other endpoint.

FIG. 2a illustrates an example of a setup that may be provided at endpoint 50. In particular embodiments, endpoint 50 is one of endpoints 14. As illustrated, endpoint 50 includes a table 52, three participants 54, three displays 56, and three camera clusters 58. While not illustrated, endpoint 50 may also include any suitable number of microphones, speakers, data input devices, data output devices, and/or any other suitable equipment to be used during or in conjunction with a video conference.

As illustrated, participants 54a, 54b, 54c are positioned around one side of table 52. On the other side of table 52 sits three displays 56d, 56e, 56f, and one of camera clusters 58d, 58e, 58f is positioned above each display 56d, 56e, 56f. In the illustrated embodiment, each camera cluster 58 contains three cameras, with one camera pointed in the direction of each of the local participants 54a, 54b, 54c. While endpoint 50 is shown having this particular configuration, it is to be understood that any suitable configuration may be employed at endpoint 50 in order to facilitate a desired video conference between participants at endpoint 50 and participants at a remote endpoint 14. As an example, camera clusters 58 may be positioned below or behind displays 56. Additionally, endpoint 50 may include any suitable number of participants 54, displays 56, and camera clusters 58.

In the illustrated embodiment, each display 56d, 56e, 56f shows one of the remote participants 54d, 54e, 54f. Display 56d shows the image of remote participant 54d; display 56e shows the image of remote participant 54e; and display 56f shows the image of remote participant 54f. These remote participants may be participating in the video conference through a remote endpoint 70, as is described below with respect to FIG. 2b. Using traditional methods, each local participant 54a, 54b, 54c would see the same image of each remote participant 54. For example, when three different individuals look at a traditional television screen or computer monitor, each individual sees the same two-dimensional image as the other two individuals. However, when multiple individuals see the same image, they may be unable to distinguish perspective-dependent non-verbal clues provided by the image. For example, remote participant 54 may point at one of the three local participants 54a, 54b, 54c to indicate to whom he is speaking. If the three local participants 54a, 54b, 54c view the same two-dimensional image of the remote participant 54, it may be difficult to determine which of the local participants 54 has been selected by the remote participant 54 because the local participants 54 would not easily understand the non-verbal clue provided by the remote participant 54.

However, displays 56 are configured to provide multiple perspective-dependent views to local participants 54. As an example, consider display 56e, which shows an image of remote participant 54e. In the illustrated embodiment, display 56e concurrently displays three different perspective-dependent views of remote participant 54e. Local participant 54a sees view A; local participant 54b sees view B; and participant 54c sees view C. Views A, B, and C all show different perspective-dependent views of remote participant 54e. View A may show an image of remote participant 54e from the left of remote participant 54e. Likewise, views B and C may show an image of remote participant 54e from the center and right, respectively, of remote participant 54*e*. In particular embodiments, view A shows the image of remote participant 54*e* that would be seen from a camera placed substantially near the image of local participant 54*a* that is presented to remote participant 54*e*. Accordingly, when remote participant 54*e* looks at the displayed image of local participant 54*a*, it appears (to local participant 54*a*) as if remote participant 54*e* were looking directly at local participant 54*a*. Concurrently, and by similar techniques, views B and C (shown to participants 54*b* and 54*c*, respectively) may see an image of remote participant 54*e* that indicated that remote participant 54*e* was looking at local participant 54*a*.

Camera clusters 58 generate video streams conveying the image of local participants 54*a*, 54*b*, 54*c* for transmission to remote participants 54*d*, 54*e*, 54*f*. These video streams may be generated in a substantially similar way as is described below in FIG. 2*b* with respect to remote endpoint 70. Moreover, the video streams may be displayed by remote displays 56*a*, 56*b*, 56*c* in a substantially similar way to that previously described for local displays 56*d*, 56*e*, 56*f*.

FIG. 2*b* illustrates an example of a setup that may be provided at the remote endpoint described above, indicated generally at 70. In particular embodiments, endpoint 70 is one of endpoints 14*a*, 14*b* in communication system 10. As illustrated, endpoint 70 includes a table 72, participants 54*d*, 54*e*, and 54*f*, displays 56*a*, 56*b*, 56*c*, and camera clusters 58.

In the illustrated embodiment, three participants 54*d*, 54*e*, 54*f* local to endpoint 70 sit on one side of table 72 while three displays 56*a*, 56*b*, and 56*c* are positioned on the other side of table 72. Each display 56*a*, 56*b*, and 56*c* shows an image of a corresponding participant 54 remote to endpoint 70. These displays 56*a*, 56*b*, and 56*c* may be substantially similar to displays 56*d*, 56*e*, 56*f* at endpoint 50. These displayed participants may be the participants 54*a*, 54*b*, 54*c* described above as participating in a video conference through endpoint 50. Above each display 56 is positioned a corresponding camera cluster 58. While endpoint 70 is shown having this particular configuration, it is to be understood that any suitable configuration may be employed at endpoint 70 in order to facilitate a desired video conference between participants at endpoint 70 and a remote endpoint 14 (which, in the illustrated embodiment, is endpoint 50). As an example, camera clusters 58 may be positioned below or behind displays 56. Additionally, endpoint 70 may include any suitable number of participants 54, displays 56, and camera clusters 58.

As illustrated, each camera cluster 58*a*, 58*b*, 58*c* includes three cameras that are each able to generate a video stream. Accordingly, with the illustrated configuration, endpoint 70 includes nine cameras. In particular embodiments, fewer cameras are used and certain video streams or portions of a video stream are synthesized using a mathematical model. In other embodiments, more cameras are used to create multiple three dimensional images of participants 54. In some embodiments, the cameras in camera clusters 58 are cameras 28. In some instances, single cameras can be used. In some instances the single cameras are moveable and can be remotely controlled.

In each camera cluster 58, one camera is positioned to capture the image of one of the local participants 54*d*, 54*e*, 54*f*. Accordingly, each local participant 54*d*, 54*e*, 54*f* has three cameras, one from each camera cluster 58, directed towards him or her. For example, three different video streams containing an image of participant 54*e* may be generated by the middle camera in camera cluster 58*a*, the middle camera in camera cluster 58*b*, and the middle camera in camera cluster 58*c*, as is illustrated by the shaded cameras. The three cameras corresponding to local participant 54*e* will each generate an image of participant 54*e* from a different angle. Likewise, three video streams may be created to include different perspectives of participant 54*d*, and three video streams may be created to include different perspectives of participant 54*f*. However, it may be desirable to have a video stream from only one camera (e.g. turning off camera clusters 58*d* and 58*e* when imaging participant 54*e*), not image positions at the endpoint that are not occupied, or to optimize the direction and angle of any of the cameras to facilitate be able to more easily interpret non-verbal cues, such as eye gaze and pointing.

Particular embodiments of endpoints 50, 70 and their constituent components have been described and are not intended to be all inclusive. While these endpoints 50, 70 are depicted as containing a certain configuration and arrangement of elements, components, devices, etc., it should be noted that this is simply an example, and the components and functionality of each endpoint 50, 70 may be combined, separated and distributed as appropriate both logically and physically. In particular embodiments, endpoint 50 and endpoint 70 have substantially similar configurations and include substantially similar functionality. In other embodiments, each of endpoints 50, 70 may include any suitable configuration, which may be the same as, different than, or similar to the configuration of another endpoint participating in a video conference. Moreover, while endpoints 50, 70 are described as each including three participants 54, three displays 56, and three camera clusters 58, endpoints 50, 70 may include any suitable number of participant 54, displays 56, and cameras or camera clusters 58. In addition, the number of participant 54, displays 56, and/or camera clusters 58 may differ from the number of one or more of the other described aspects of endpoint 50, 70. Any suitable number of video streams may be generated to convey the image of participants 54 during a video conference.

As shown in reference to FIG. 2*a* and FIG. 2*b*, in a video conference room with multiple chairs (i.e., multiple positions), human presence can be detected by using multiple video cameras pointed at the chairs. Based on the number of people in each room in each endpoint of the conference, embodiments of the videoconferencing system can configure conference geometry by selecting from a plurality of cameras pointed at the participants from different angles. This can result in a more natural eye-gaze between conference members.

In one embodiment, human presence (i.e., presence detection) can be accomplished using face detection algorithms and technology. Face detection is performed on the video signal from cameras which cover all the possible seating positions in the room. Face detection, in one embodiment, van be performed on an input to the video encoder as a HD resolution picture captured in a video conferencing system. The video encoder can be comprised of one or more processors, each of which processes and encodes one row of macroblocks of the picture. For each 16×16 macroblock (MB), the one or more processors perform pre-processing e.g. color space conversion, edge detection, edge thinning, color segmentation, and feature summarization, before coding the block. At the end, the one or more processors transfer two results to a base processor: the total number of original edge features in the MB and the total number of thinned, color-segmented edge features in the MB. The base processor collects the results for all the MBs and performs fast detection of face regions, while the one or more processors can proceed with general video coding tasks including motion estimation, motion compensation, and block transform. With feedback from the base processor, the one or more processors then encode the transform coefficients of the MBs based on the face detection result, following a pre-defined scheme to assign coding parameters such as quantization step size.

The raw face detection is refined by tracking and hysteresis to produce high-confidence data on how many people are in the room and which chairs (i.e., positions) they are in.

Other methods of presence detection can also be employed in embodiments according to the present invention such as motion detection, chair sensors, or presence monitoring with RFID or ID badges, which require external infrastructure and personal encumbrance.

Videoconference endpoints 14 of FIG. 1 can be configured in various ways. For instance, in one embodiment the videoconference endpoint is comprised of a plurality of large video displays that can be mounted end to end, on one side of a room, with a slight inward tilt to the outer two (see FIG. 2a and FIG. 2b). Nominally, a three video display system (the "triple") is configured to allow six people to participate, with cameras pointed at pairs accordingly. Other configurations can have only one video display.

Figure 3:
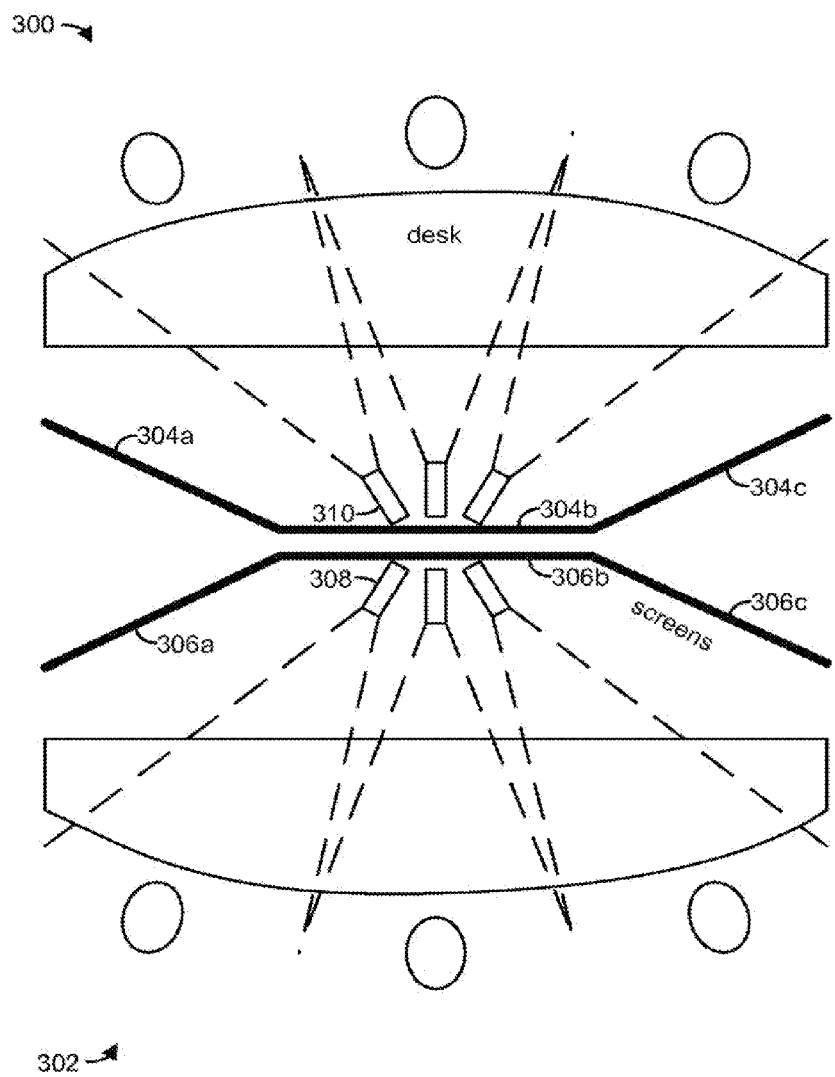
FIG. 3 is an example illustration of a multi-point videoconferencing system having two endpoints showing two triples talking to each other, which can be referred to as a 2×3 conference.

In multi-point conferences, there can be various combinations of singles talking to triples. For instance, FIG. 3 is an example illustration of a multi-point videoconferencing system having two endpoints 300, 302 showing two triples talking to each other, which can be referred to as a 2×3 conference. Each video display 304, 306 at each endpoint 300, 302 displays video from a corresponding camera 308, 310 in the other endpoint.

In order to preserve an illusion of a single room divided by a sheet of glass, the cameras 308, 310 can placed over the center video display 304b, 306b in each room, allowing the geometry of the room to be preserved. The multiple cameras 308, 310 act as one wide angle camera. Each participant is picked up by one and only one camera depending upon the position occupied by the participant.

Figure 4:
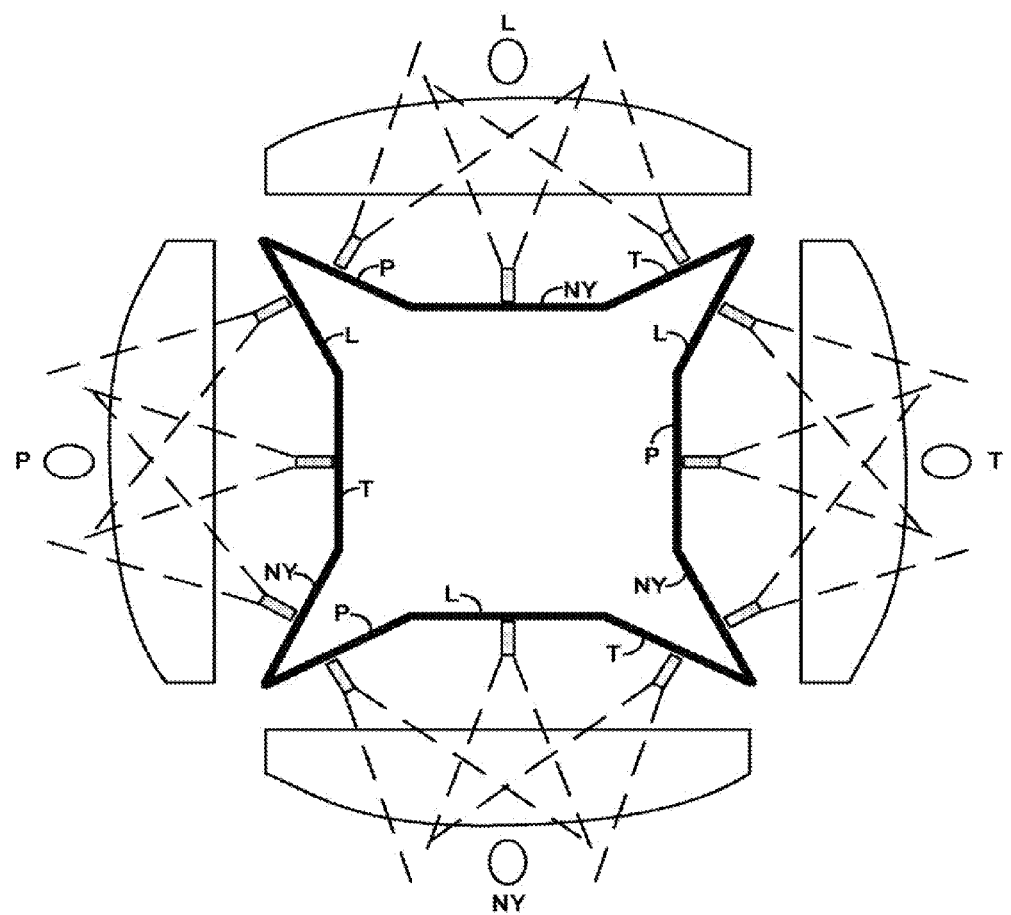
FIG. 4 shows a multipoint conference occurring between four people in different locations, which can be referred to as a 4×1 conference.

FIG. 4 shows multipoint conferences occurring between four people in different locations, which can be referred to as a 4×1 conference. This situation is sometimes depicted with location tags on each screen such as, for example, Paris, London, New York and Tokyo (P, L, T, NY). A participant in Paris would see London, New York, Tokyo; a participant in London would see Paris, New York and Tokyo; etc. To create and maintain the illusion that these four people are seated at one large round table, then if Paris can see London on his left, then London should see Paris on his right; cameras should be located over each of the three screens, all pointed towards the solo person at the desk; the signal from the left camera should be sent to the endpoint that is shown on a left screen, etc. That is, the camera over the Paris screen in any of the three endpoints other than Paris is the camera that is providing the video signal from the present endpoint (London, New York or Tokyo) to the Paris endpoint.

Figure 5A:
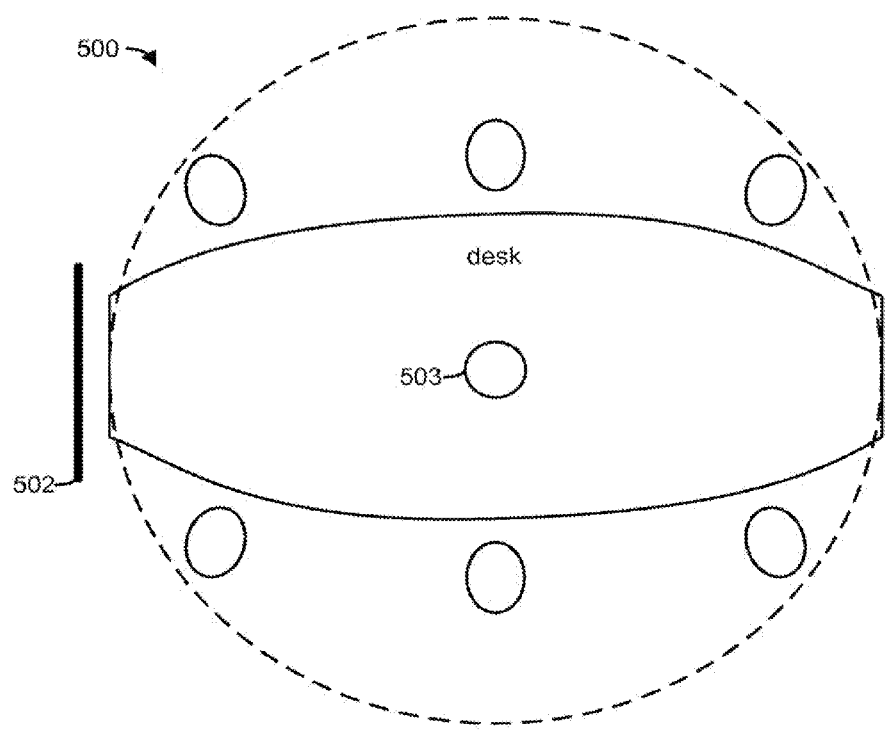
FIG. 5a-5c illustrate an example of a multi-point videoconferencing system having two endpoints showing a group of six participants at one endpoint talking to one participant at another endpoint.
Figure 5B:
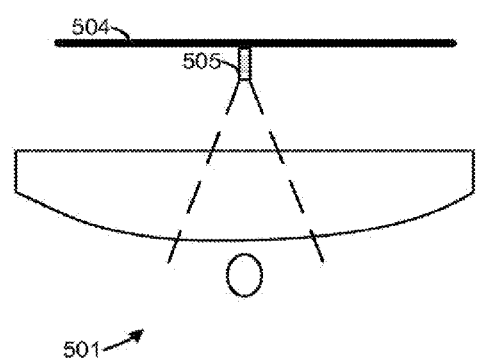
Figure 5C:
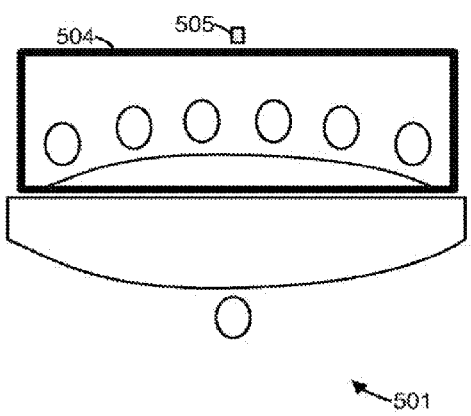

FIG. 5a, FIG. 5b, and FIG. 5c provide an example illustration of a multi-point videoconferencing system having two endpoints 500 and 501. Endpoint 500 can comprise a plurality of local participants, in this case six. Screen 502 can be used to display one or more remote participants. For example, screen 502 can be used to display the remote participant from endpoint 501. Camera 503 can comprise any suitable hardware and/or software to facilitate capturing an image of the local participants and the surrounding area as well as sending the image to remote participants. In an embodiment, camera 503 can be a single wide angle lens capturing a 360° view, two cameras each capturing a 180° view, one or more cameras capturing a greater than 180° view, or any configuration which captures a 360° feed, sends it to an application which processes the same and provides a panoramic view on screen 504 to a remote participant at endpoint 501.

Camera 505 at endpoint 501 can comprise any suitable hardware and/or software to facilitate capturing an image of the remote participant at endpoint 501 and the surrounding area as well as sending the image to the local participants at endpoint 500. Screen 504 at endpoint 501 can be used to provide a panoramic view of the local participants from endpoint 500.

Figure 6:
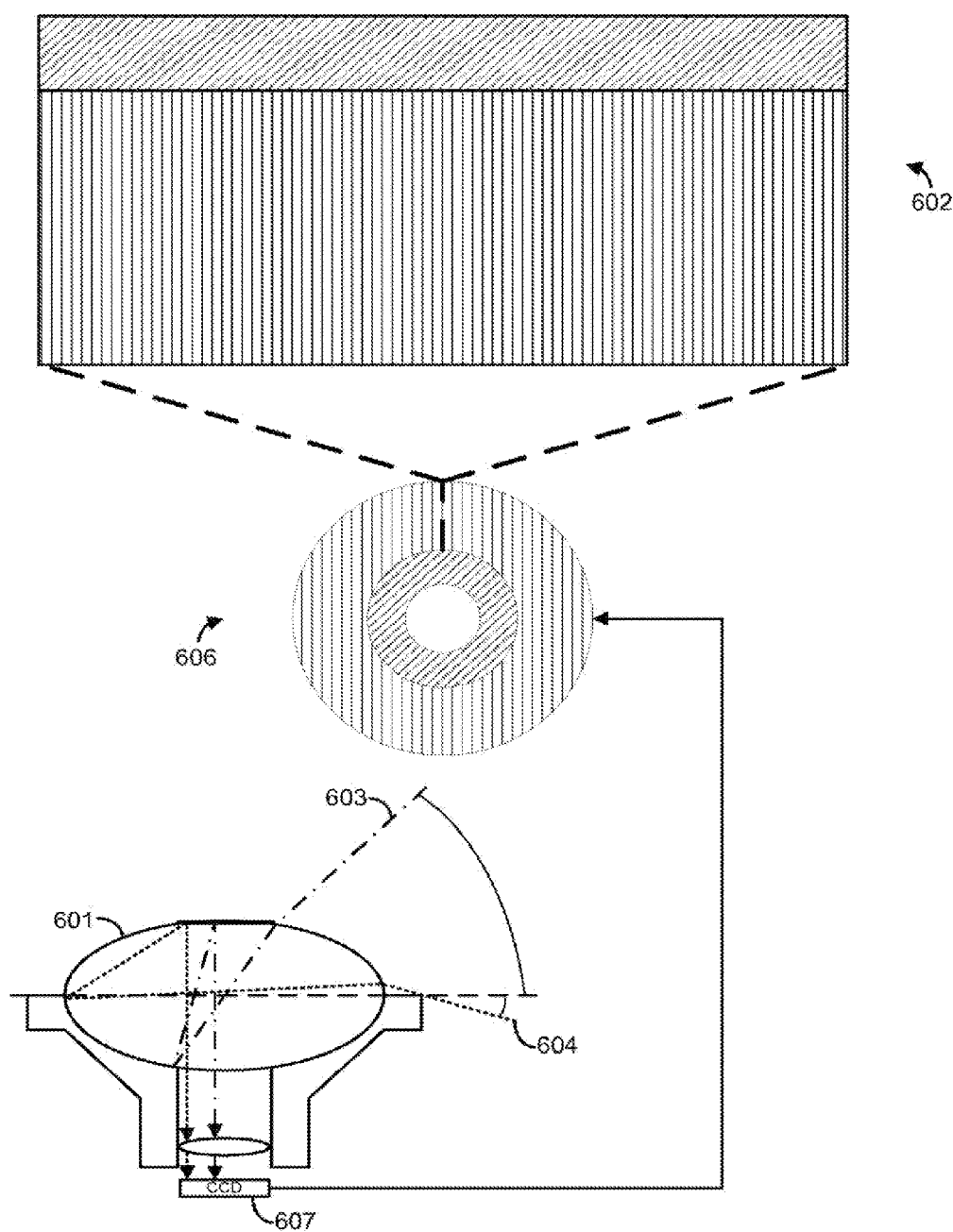
FIG. 6 illustrates an example panoramic lens and a panoramic image.

As shown in FIG. 6, use of a panoramic lens 601 causes distortion to a captured video frame 602. The image of all the surroundings is reflected twice on two reflective surfaces, one in the lower part of the lens and the other at the top and the image is formed in a ring shape 606 on a CCD 607. Line 603 corresponds to the topmost part of the video frame 602, while line 604 corresponds to the bottommost part of the video frame 602. In the embodiment shown, everything around the lens to be imaged within a range of approximately 70° above the plane of the lens and 17° below that plane will be imaged.

Typically the upper part of the resultant rectilinear frame (indicated with diagonal lines in the ring shape 606 and the video frame 602) results in poorer image resolution, because the lens has "squeezed" a wider view of the panoramic scene into the upper part of the frame. Depending on lens orientation off either upward or downward, the distortion will be either in the upper or lower portion of the frame. The methods are described herein, as applied to an upper portion of the video frame 602 whereby the upper portion is more distorted than the lower portion. However, it is specifically contemplated that the methods can be applied to the more distorted region, regardless of its relative position in the frame.

In one embodiment, provided are methods for panoramic image processing in a Telepresence environment. The disclosed methods can utilized adaptive and variable compression techniques and projection placement techniques. These methods, when combined with Telepresence's existing audio, video and networking capability, create a true "in-person" solution and overcome the drawbacks of current Telepresence offerings.

In one embodiment provided are variable and adaptive compression methods that apply higher quality coding (less compression) to portions of the frame that have been highly squeezed by the panoramic lens. This adaptive compression can be line by line or sector by sector. This adaptive compression can also be frame by frame by applying more frame rate to the corresponding areas of the frame that are more squeezed.

The system provided can perform coding of images according to the MPEG (Moving Picture Experts Group) series standards (MPEG-1, MPEG-2, and MPEG-4) standardized by the international standardization organization ISO (International Organization for Standardization)/IEC (International Electrotechnical Commission), the H.26x series standards (H.261, H.262, H.263) standardized by the international standardization organization with respect to electric communication ITU-T (International Telecommunication Union-Telecommunication Standardization Sector), or the H.264/AVC standard which is a moving image compression coding standard jointly standardized by both the standardization organizations.

With the MPEG series standards, in a case of coding an image frame in the intra-frame coding mode, the image frame to be coded is referred to as the "I (Intra) frame". In a case of coding an image frame with a prior frame as a reference image, i.e., in the forward interframe prediction coding mode, the image frame to be coded is referred to as the "P (Predictive) frame". In a case of coding an image frame with a prior frame and an upcoming frame as reference images, i.e., in the bi-directional interframe prediction coding mode, the image frame to be coded is referred to as the "B frame".

In modern block based transform compression techniques, image data can by systematically divided into segments or blocks that are transformed, quantized, and encoded independently. An exemplary video bitstream can be made up of blocks of pixels, macroblocks (MB), pictures, groups of pictures (GOP), and video sequences. In one aspect, the smallest element, a block, can consist of 8 lines×8 pixels per line or 4 lines×4 pixels per line (H.264). As is known in the art, H.264 consists of 16×16 (macro block), 16×8, 8×16, 8×8, 8×4, 4×8, and 4×4 blocks and MPEG4 Part 2 consists of 16×16 and 8×8 blocks, any such block can be used. Blocks are grouped into macroblocks (MB), according to a predefined profile. The system provided can receive an input signal, such as moving images in units of frames, perform coding of the moving images, and output a coded stream. The input signal can be, for example, a 360° feed of images. If required, motion compensation can be performed for each macro block or sub-macro block of a P frame or B frame. Discrete Cosine Transform (DCT) processing can be used to transform image information to the frequency domain, resulting in DCT coefficients. The DCT coefficients thus obtained can then be quantized. The DCT coefficients can be weighted and truncated, providing the first significant compression. The coefficients can then be scanned along a predetermined path such as a zigzag scan to increase the probability that the significant coefficients occur early in the scan. Other predetermined scanning paths as known in the art can be used. After the last non-zero coefficient, an EOB (end of block) code can be generated.

The quantization parameters (QP) used to determine the fineness and coarseness of quantizing coefficients in the coded blocks can be assigned with a lower value at the upper part of the rectilinear frame. This can provide higher quality coding to the upper part of the frame. In one embodiment, the quantization parameter can be increased gradually from the upper part of the rectilinear frame to the lower part of the rectilinear frame.

For example, in one embodiment, let the rectilinear frame be represented by k lines with the pixel resolution at the first/top line and last/bottom line be represented by n and (n+m), respectively. Then the pixel resolution for ith line of the rectilinear frame can be represented by $n+(i-1)m/(k-1)$, i=1, 2, 3, ..., k. The adaptive quantization parameter for ith line or a group of lines adjacent to the ith line can be defined using a function or a look up table. The functional relationship between the QP and the resolution can be determined experimentally. As an example, assuming the QP is directly proportional to the square root of the resolution, then the QP which is used to code the rectilinear frame can be represented by taking the round off value of the square root of $\{[n+(i-1)m/(k-1)]/n\}QP$. The QP within a group of lines can be further adjusted to ensure that the same QP value is used for each macroblock in a block based transform compression.

As another example, the correlation coefficient of adjacent pixels can be measured for each line or group of lines and QP can be adjusted with respect to the correlation coefficient. The higher the correlation coefficient, the larger the QP. The relationship between the QP and the correlation coefficient can be determined experimentally.

In a motion compensated transform coding, a block (or a group of blocks) in the present frame is compared to the block (or group of blocks) in the past and/or future frame to determine the closeness of the blocks (or group of blocks). The comparison can be carried out by finding the differences between the pixels in the present block (or group of blocks) and the pixels in the past and/or future block, summarizing the differences in absolute value, and comparing the summarized absolute difference with a predetermined threshold. The smaller or tighter the threshold, the more accurate the block is classified and, thereby, the finer the quality of the block coding.

In another embodiment, the thresholds used to determine predicted block types or macroblock types can be tightened at the upper part of the rectilinear frame to push more macroblocks from non-motion compensated blocks to motion compensated blocks, from non-coded blocks to coded blocks, and from inter blocks to intraframe blocks. This can provide higher quality coding to the upper part of the frame at the expense of higher bit rate (less compression). The thresholds can be loosened gradually from the upper part of the rectilinear frame to the lower part of the rectilinear frame.

Figure 7:
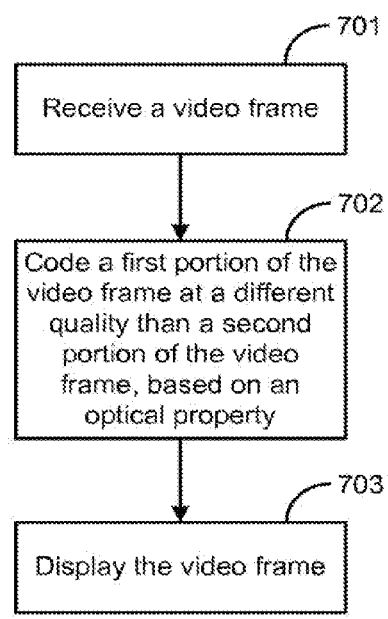
FIG. 7 is an example flowchart for image processing in a videoconferencing system.

As shown in the example flowchart of FIG. 7, provided are methods for image processing, comprising receiving a video frame at 701, coding a first portion of the video frame at a different quality than a second portion of the video frame, based on an optical property at 702, and displaying the video frame at 703.

The video frame can be received from a panoramic video camera, a plurality of cameras providing a 360° feed, or a plurality of cameras providing a feed greater than 180°.

Coding the first portion of the video frame at a different quality than the second portion of the video frame, based on an optical property can comprises transforming the first and second portions of the video frame, resulting in a first and second plurality of coefficients, quantizing the first plurality of coefficients based on a first plurality of quantization parameters, and quantizing the second plurality of coefficients based on a second plurality of quantization parameters.

The methods can further comprise determining the first plurality of quantization parameters based on the optical property. The optical property can be an optical property of a panoramic video camera. The optical property can be an optical distortion property of a panoramic video camera. The optical distortion property can be predetermined. The optical distortion property can be predetermined by measuring distortion of a known video frame. The optical distortion property can be predetermined by at least one of, measuring distortion of a known video frame at different camera focal lengths, measuring distortion of a known video frame by determining pixel resolution for a line or a group of lines, or measuring distortion of a known video frame by determining correlation coefficients between adjacent pixels The distortion of a known video frame can be pixel resolution for a line or a group of lines and/or the correlation coefficients between adjacent pixels. The optical distortion property can be predetermined by measuring distortion of a known video frame at different camera focal lengths. The difference in resolution between lines or groups of lines and the difference in pixel correlation within a line or a group of lines are all distortions created by warping a panoramic picture to a rectilinear picture.

Quantizing the first plurality of coefficients based on a first plurality of quantization parameters and quantizing the second plurality of coefficients based on a second plurality of quantization parameters can comprise quantizing the first plurality of coefficients more than the second plurality of coefficients, resulting in higher quality coding of the first portion of the video frame.

Quantizing the first plurality of coefficients based on a first plurality of quantization parameters and quantizing the second plurality of coefficients based on a second plurality of quantization parameters can comprise quantizing the first plurality of coefficients less than the second plurality of coefficients, resulting in lower quality coding of the first portion of the video frame.

Figure 8:
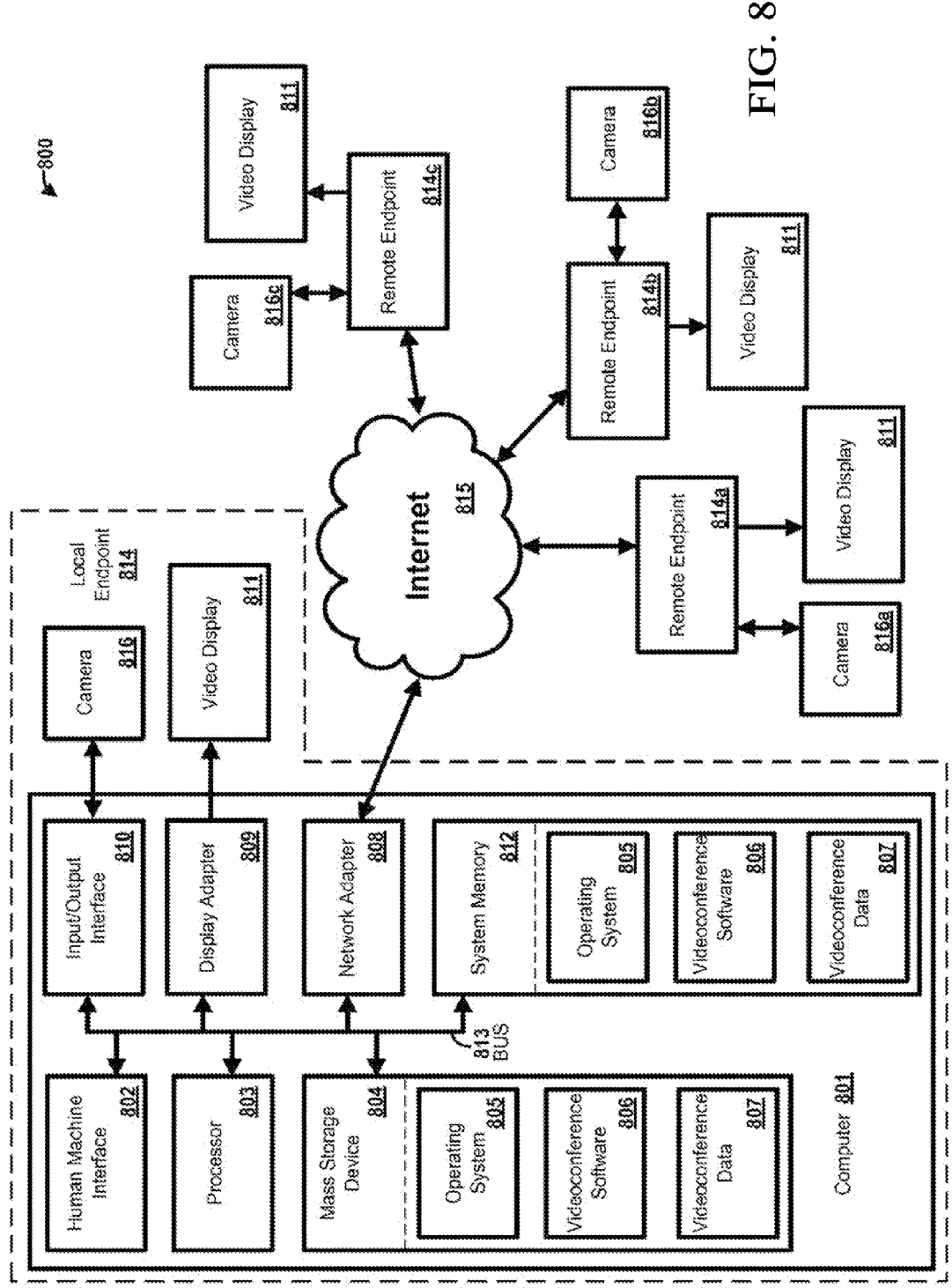
FIG. 8 is an illustration of an embodiment of a multi-point videoconferencing system.

FIG. 8 is a block diagram illustrating an example operating environment for performing the disclosed method. One skilled in the art will appreciate that provided is a functional description and that the respective functions can be performed by software, hardware, or a combination of software and hardware. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 813, and all buses specified in this description can also be implemented over a wired or wireless network connection and each of the subsystems, including the processor 803, a mass storage device 804, an operating system 805, videoconference software 806, video-conference data 807, a network adapter 808, system memory 812, an input/output interface 810, a display adapter 809, a display device 811, a human machine interface 802, and a camera 816, can be contained within a local endpoint 814 and one or more remote endpoints 814a,b,c at physically separate locations, connected through buses of this form, in effect implementing a fully distributed system.

The computer 801 typically comprises a variety of computer readable media. Example readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as videoconference data 807 and/or program modules such as operating system 805 and videoconference software 806 that are immediately accessible to and/or are presently operated on by the processing unit 803.

In another embodiment, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and videoconference software 806. Each of the operating system 805 and videoconference software 806 (or some combination thereof) can comprise elements of the programming and the videoconference software 806. Videoconference data 807 can also be stored on the mass storage device 804. Videoconference data 807 can be stored in any of one or more databases known in the art. Examples of such databases comprise, DB2®, Microsofti® Access, Microsoft® SQL Server, Oracle®, mySQL, PostgreSQL, and the like. The databases can be centralized or distributed across multiple systems.

In another embodiment, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another embodiment, a display device 811, such as a video display, can also be connected to the system bus 813 via an interface, such as a display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via Input/Output Interface 810.

The computer 801 can operate in a networked environment using logical connections to one or more remote endpoints 814a,b,c. By way of example, a remote computing device at a remote endpoint 814 can be a personal computer, portable computer, a server, a router, a network computer, a peer device or other common network node, and so on. Logical connections between the computer 801 and a remote endpoint 814a,b,c can be made via a local area network (LAN) and a general wide area network (WAN). Such network connections can be through a network adapter 808. A network adapter 808 can be implemented in both wired and wireless environments. Such networking environments are conventional and commonplace in offices, enterprise-wide computer networks, intranets, and the Internet 815.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of videoconference software 806 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for image processing in a videoconference, comprising:
   receiving a video frame;
   coding a first portion of the video frame at a different quality than a second portion of the video frame, based on an optical property wherein the optical property is an optical distortion property of a panoramic video camera, predetermined by measuring distortion of a known video frame; and
   displaying the video frame.

2. The method of claim 1, wherein the video frame is received from a panoramic video camera.

3. The method of claim 1, wherein coding the first portion of the video frame at a different quality than the second portion of the video frame, based on an optical property comprises:
   transforming the first and second portions of the video frame, resulting in a first and second plurality of coefficients;
   quantizing the first plurality of coefficients based on a first plurality of quantization parameters; and
   quantizing the second plurality of coefficients based on a second plurality of quantization parameters.

4. The method of claim 3, further comprising determining the first plurality of quantization parameters based on the optical property.

5. The method of claim 4, wherein the optical property is an optical property of a panoramic video camera.

6. The method of claim 1, wherein the optical distortion property is predetermined.

7. The method of claim 1, wherein the optical distortion property is predetermined by at least one of, measuring distortion of a known video frame at different camera focal lengths, measuring distortion of a known video frame by determining pixel resolution for a line or a group of lines, or measuring distortion of a known video frame by determining correlation coefficients between adjacent pixels.

8. The method of claim 3, wherein quantizing the first plurality of coefficients based on a first plurality of quantization parameters and quantizing the second plurality of coefficients based on a second plurality of quantization parameters comprises quantizing the first plurality of coefficients more than the second plurality of coefficients, resulting in higher quality coding of the first portion of the video frame.

9. The method of claim 3, wherein quantizing the first plurality of coefficients based on a first plurality of quantization parameters and quantizing the second plurality of coefficients based on a second plurality of quantization parameters comprises quantizing the first plurality of coefficients less than the second plurality of coefficients, resulting in lower quality coding of the first portion of the video frame.

10. A multi-point videoconferencing system comprised of:
    a first point of the multi-point videoconferencing system comprised of a first camera, a first video display, and one or more first positions, wherein a video frame captured at the first point is a panoramic image;

a second point of the multi-point videoconferencing system comprised of a second camera, a second video display, one or more second positions; and a processor operably connected with the first camera, wherein the processor is configured to code a first portion of the video frame at a different quality than a second portion of the video frame, based on an optical property; wherein the optical property is an optical distortion property of the first video camera, predetermined by at least one of, measuring distortion of a known video frame at different camera focal lengths, measuring distortion of a known video frame by determining pixel resolution for a line or a group of lines, or measuring distortion of a known video frame by determining correlation coefficients between adjacent pixels.

11. The system of claim 10, wherein the first camera is a panoramic video camera.

12. The system of claim 10, wherein the processor is further configured to:
transform the first and second portions of the video frame, resulting in a first and second plurality of coefficients;
quantize the first plurality of coefficients based on a first plurality of quantization parameters; and
quantize the second plurality of coefficients based on a second plurality of quantization parameters.

13. The system of claim 12, wherein the processor is further configured to determine the first plurality of quantization parameters based on the optical property.

14. The system of claim 12, the processor is further configured to quantize the first plurality of coefficients more than the second plurality of coefficients, resulting in higher quality coding of the first portion of the video frame.

15. The system of claim 12, wherein the processor is further configured to quantize the first plurality of coefficients less than the second plurality of coefficients, resulting in lower quality coding of the first portion of the video frame.

16. A computer readable storage medium having computer executable instructions embodied thereon for image processing, comprising:
receiving a video frame from a video camera in a video conference;
predetermining an optical distortion property of the video camera by at least one of, measuring distortion of a known video frame at different camera focal lengths, measuring distortion of a known video frame by determining pixel resolution for a line or a group of lines, or measuring distortion of a known video frame by determining correlation coefficients between adjacent pixels;
coding a first portion of the video frame at a different quality than a second portion of the video frame, based on the optical distortion property; and
displaying the video frame.

17. The computer readable medium of claim 16, further comprising:
transforming the first and second portions of the video frame, resulting in a first and second plurality of coefficients;
quantizing the first plurality of coefficients based on a first plurality of quantization parameters; and
quantizing the second plurality of coefficients based on a second plurality of quantization parameters.

* * * * *